United States Patent
Yudintsev et al.

(10) Patent No.: US 8,770,979 B2
(45) Date of Patent: Jul. 8, 2014

(54) SYSTEM AND METHOD FOR SIMULATED AIRCRAFT CONTROL THROUGH DESIRED DIRECTION OF FLIGHT

(71) Applicant: Gaijin Entertainment Corporation, Alexandria, VA (US)

(72) Inventors: Kirill Yudintsev, Moscow (RU); Alexander Polyakov, Moscow (RU)

(73) Assignee: Gaijin Entertainment Corp., Alexandria, VA (US)

( * ) Notice: Subject to any disclaimer, the term of this patent is extended or adjusted under 35 U.S.C. 154(b) by 0 days.

(21) Appl. No.: 13/792,025

(22) Filed: Mar. 9, 2013

(65) Prior Publication Data

US 2013/0252208 A1    Sep. 26, 2013

Related U.S. Application Data

(60) Provisional application No. 61/613,513, filed on Mar. 21, 2012.

(51) Int. Cl.
*G09B 9/08* (2006.01)
*G09B 9/24* (2006.01)
*G09B 9/16* (2006.01)
*G09B 9/30* (2006.01)

(52) U.S. Cl.
CPC .. *G09B 9/24* (2013.01); *G09B 9/16* (2013.01); *G09B 9/30* (2013.01)

USPC ................................................. 434/51; 434/29

(58) Field of Classification Search
USPC .......................... 434/29–71; 701/14; 703/17
See application file for complete search history.

(56) References Cited

U.S. PATENT DOCUMENTS

| 6,236,914 | B1 | 5/2001 | Kaloust |
| 7,236,914 | B1 | 6/2007 | Zyskowski |
| 7,284,984 | B1 | 10/2007 | Zyskowski |
| 7,365,705 | B2 * | 4/2008 | Knoll ............................... 345/7 |
| 2011/0171612 | A1 * | 7/2011 | Gelinske et al. ................ 434/35 |

FOREIGN PATENT DOCUMENTS

FR    2 936 882    4/2010

OTHER PUBLICATIONS

European search report in EP 13 16 0458, dated Jul. 30, 2013.

* cited by examiner

*Primary Examiner* — Timothy A Musselman
(74) *Attorney, Agent, or Firm* — Bardmesser Law Group

(57) ABSTRACT

An aircraft control system for a user of a simulated aircraft. The system includes input devices for controlling the simulated aircraft, a video display having three-dimensional graphics, modeling software for determining position and orientation information based on desired direction of flight obtained through the input devices. User controls desired direction of flight through the input devices, thus controlling aircraft. The aircraft control system may be embodied as a flight game.

23 Claims, 13 Drawing Sheets

SYSTEM AND METHOD FOR SIMULATED AIRCRAFT CONTROL THROUGH DESIRED DIRECTION OF FLIGHT

CROSS-REFERENCE TO RELATED APPLICATIONS

The present application claims priority to the U.S. Provisional Patent Application No. 61/613,513, filed Mar. 21, 2012, which is incorporated herein by reference in its entirety.

BACKGROUND OF THE INVENTION

1. Field of the Invention

The present invention generally relates to aircraft control method, and, more particularly, to flight simulators.

2. Description of the Related Art

A flight simulator can be defined as a system that simulates the operating conditions of an aircraft in an environment. The environment typically includes landscape, static objects, such as houses, bridges, trees, etc., and atmosphere. The environment may also include weather conditions and atmospheric effects, such as clouds, rain, thunderstorm, snow, blizzard, etc.

Flight simulators provide a means to experience aircraft handling and behavior in a variety of situations and environments. However, direct control over simulated aircraft can be challenging, especially when a user need to operate multiple input devices. But when the user controls a desired direction of flight of the simulated aircraft, the user can operate a simulated aircraft without a need to control multiple input devices just to align the aircraft with the desired direction.

Controlling desired direction of flight instead of controlling, for example, ailerons, elevator and rudder, the user will be able to takeoff, land, fly traffic patterns, intercept other aircraft, etc., without spending a long time learning how to align simulated aircraft with the desired direction.

SUMMARY OF THE INVENTION

The objectives of the invention are satisfied by a combination that includes a control system of a simulated aircraft, comprising one or a plurality of simulated input devices for controlling the simulated aircraft. For the example of a flight simulator, input devices may include a keyboard and a computer mouse. The simulated aircraft control system further includes a video display for presenting the user with a view of a simulated environment. The control system also includes a modeling means responsive to the desired direction of flight for determining position and orientation of the simulated aircraft. The present invention can also be embodied as a flight simulator.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS OF THE INVENTION

Reference will now be made in detail to the preferred embodiments of the present invention, examples of which are illustrated in the accompanying drawings.

Figure 1:
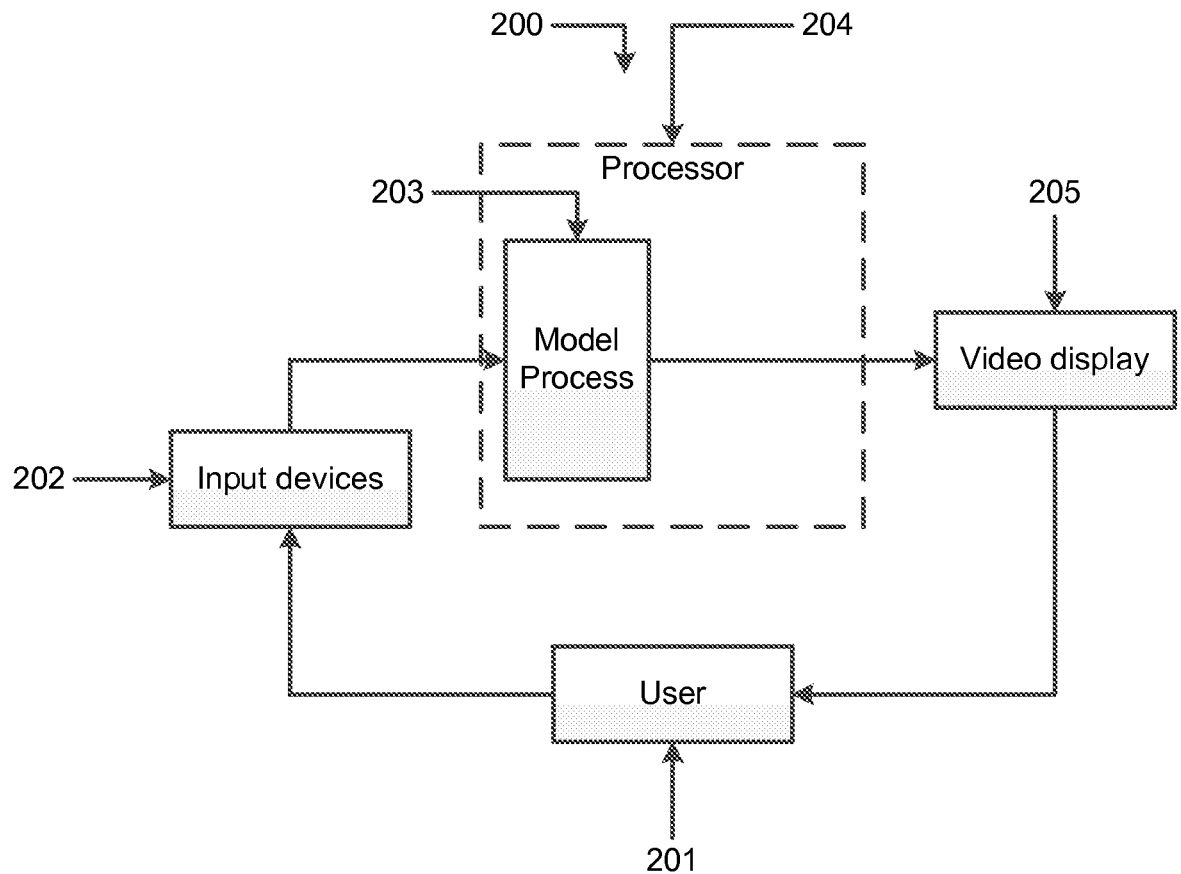
FIG. 1 is a block diagram of a preferred flight simulator of the present invention.

FIG. 1 shows one preferred embodiment of an aircraft control system 200 of the present invention. The aircraft control system is operated by a user 201 (shown schematically), who desires to pilot a simulated aircraft.

In FIG. 1, the user preferably operates a pointing input device 202, such as a computer mouse, a touch screen or a trackball. With such devices, accuracy is increased, compared to input devices like computer keyboard, joysticks etc.

In the aircraft control system 200, the user 201 uses input devices 202 of choice in the customary manner (i.e., as if working with a computer, rather than with a flight simulator). Then input from input devices 202 is transferred to processor 204. The processor 204, in the preferred embodiment executes computer software, which is logically organized to include a model process 203.

The model process 203 receives digitized signals from the input devices 202 and changes desired direction of flight according to the signals. Then, the model process 203 simulates an aircraft and displays the simulated aircraft in a new position and orientation, as well as in a simulated environment, through a video display 205, which is then observed by the user 201.

Figure 2:
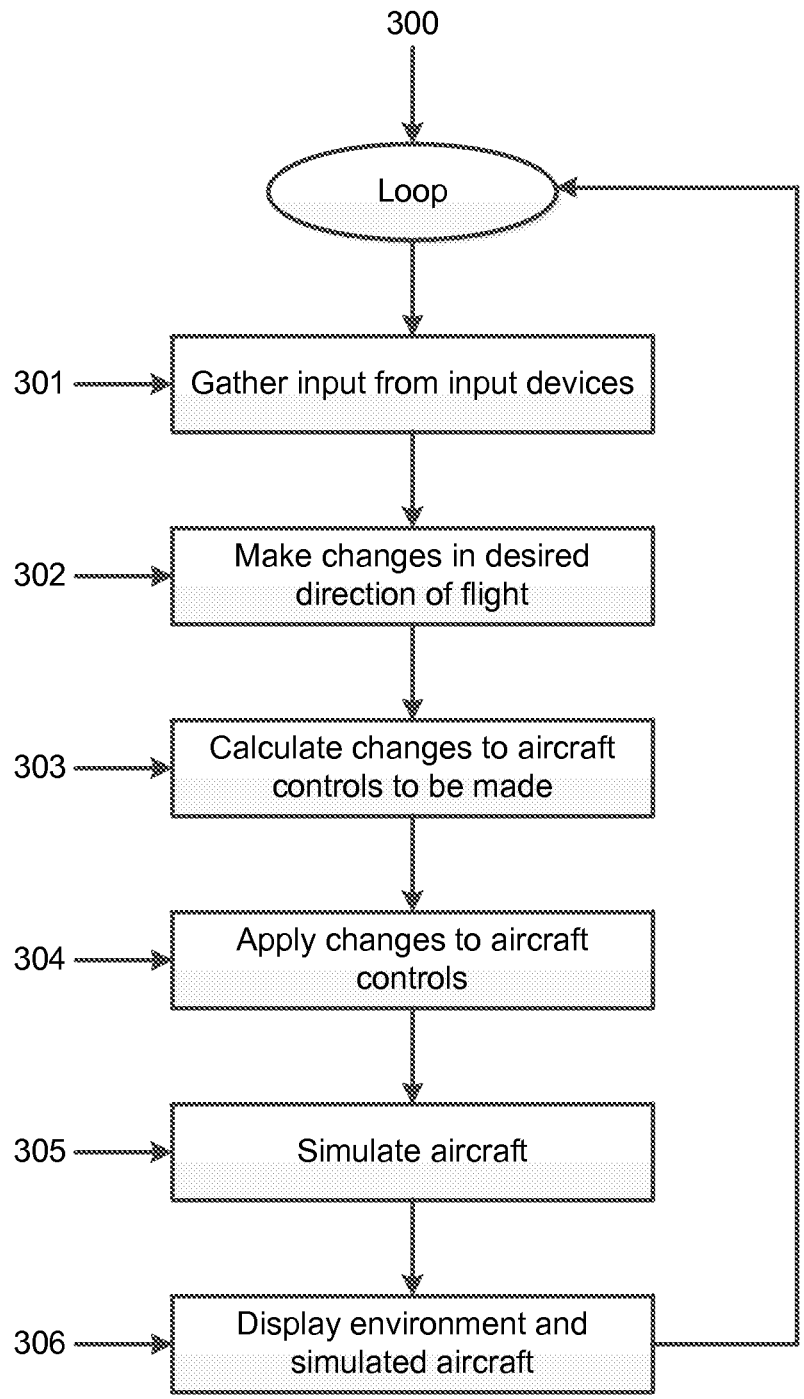
FIG. 2 is a flow diagram of a model process that forms a portion of the flight simulator shown in FIG. 1.

FIG. 2 shows the model process 203 from FIG. 1. Model process 300 starts by collecting input from input devices 301. Then it calculates what changes should be done to desired direction of flight 302. After that the model process 300 calculates how simulated aircraft controls should be adjusted to align with a desired direction of flight 303. More detailed implementations of process 303 are described in FIG. 5, FIG. 6 and FIG. 7. Then the model process 300 applies the adjustments changes to simulated aircraft 304. Thereafter, the model process 300 simulates the aircraft 305. After that, the model process 300 displays the environment and a simulated aircraft 306.

Figure 3:
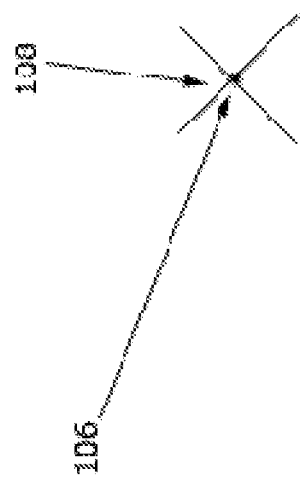
FIG. 3 is a diagram of the user's view when a simulated aircraft is aligned with a desired direction of flight.
Figure 3:
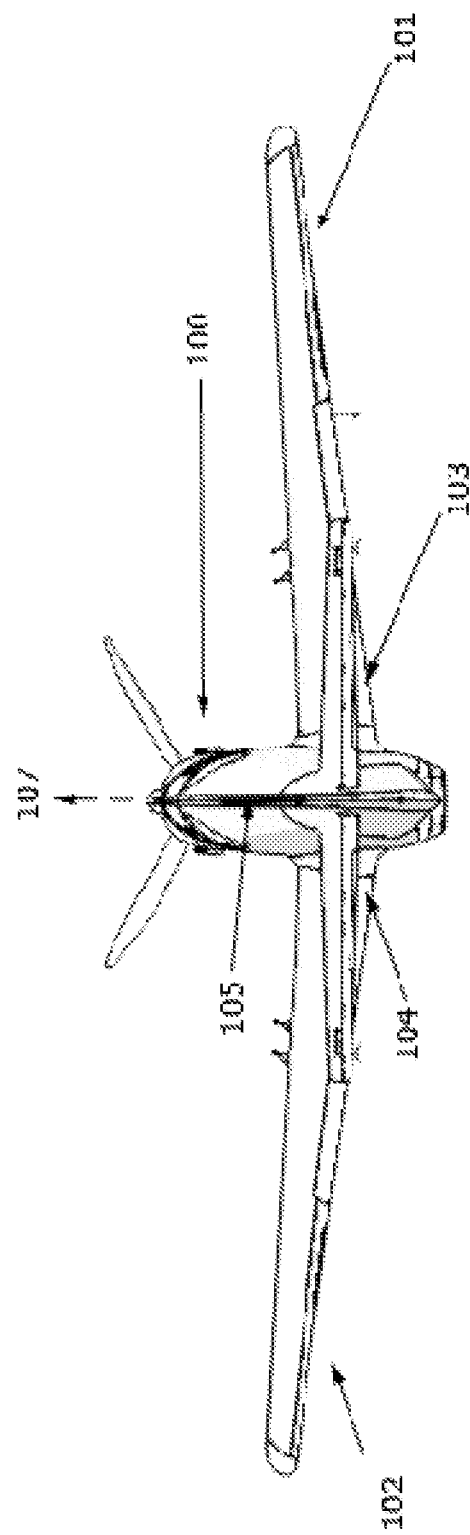

FIG. 3 shows a user's view of a simulated aircraft 100 (such as shown in a browser-based display, or in a standalone application screen), flying in a direction 107, which is aligned with a projected desired direction of flight 106. As the simulated aircraft 100 is aligned with the desired direction of flight 106 (shown on the screen to the user by a graphical element, such as a small circle, or an "x", or a cross-hairs, see screenshots in FIGS. 9-13), its ailerons 101-102, its elevator 103-104 and its rudder 105 are in such position so simulated aircraft 100 will keep its direction 107 aligned with desired direction of flight 106. Also, the camera is set in such manner that the desired direction of flight 106 is in exact center of the user's view 108.

Figure 4:
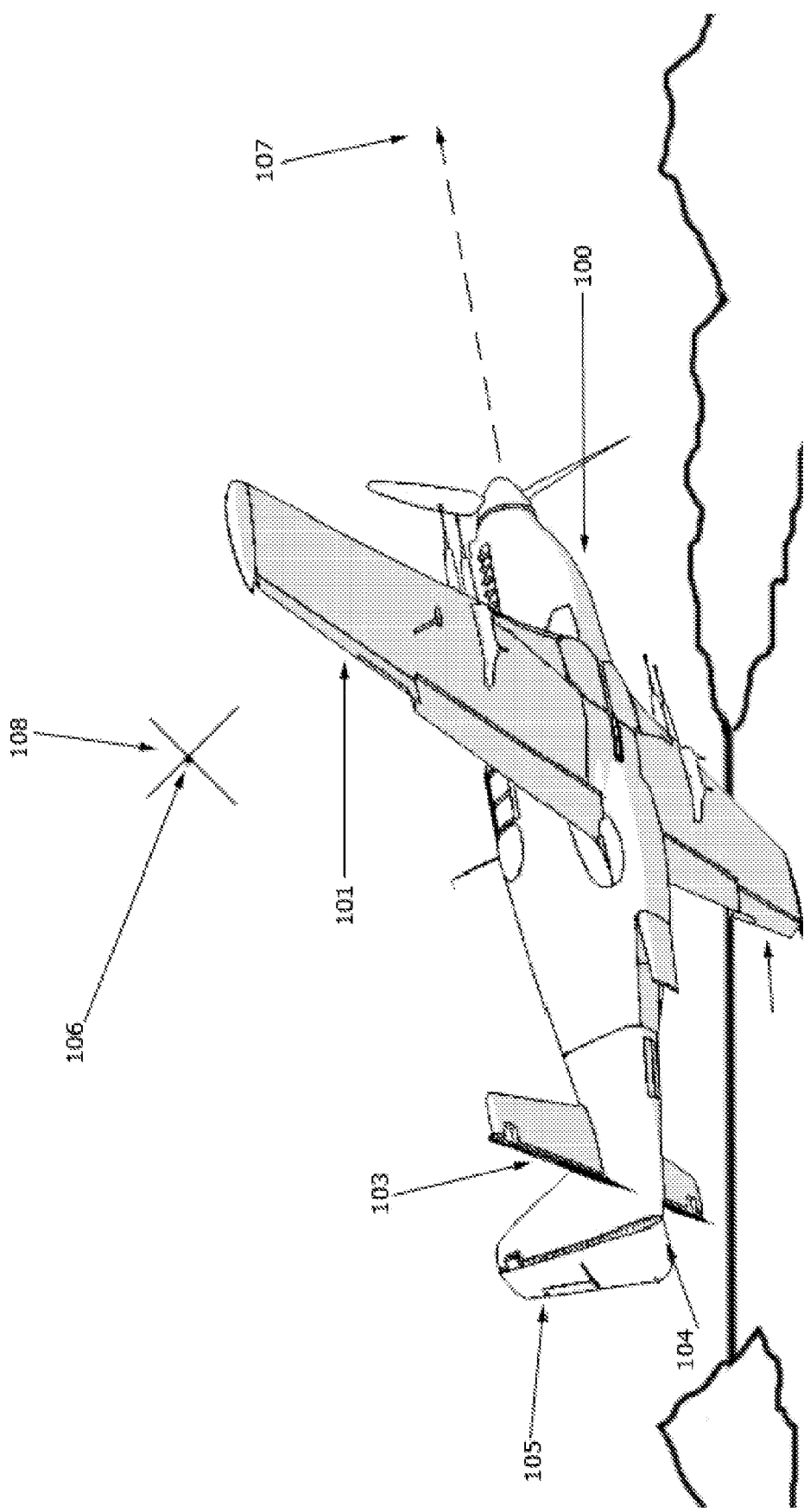
FIG. 4 is a diagram of the user's view when a simulated aircraft is in the process of aligning with a desired direction of flight.

FIG. 4 shows a user's view of the simulated aircraft 100, flying in a direction 107, which is not aligned with the projected desired direction of flight 106. As the simulated aircraft 100 is not aligned with the desired direction of flight 106, its ailerons 101-102, its elevator 103-104 and its rudder 105 are oriented in such position that the simulated aircraft 100 will align its flight direction 107 with the desired direction of flight 106 after several simulation steps.

Figure 5:
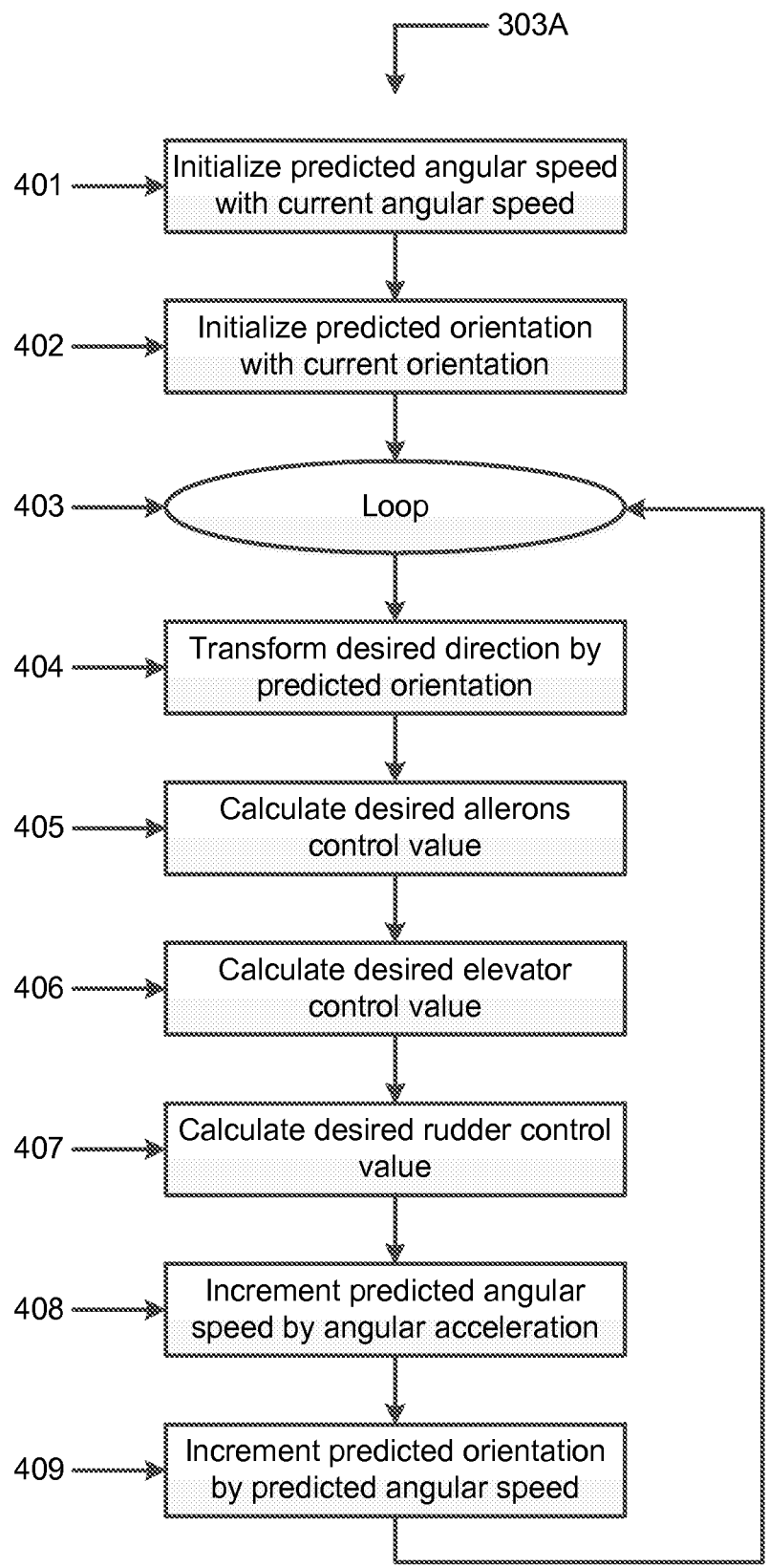
FIG. 5 is a flow diagram of one preferred implementation of a portion of process shown in FIG. 2.

FIG. 5 shows a flow diagram with one preferred implementation of the process 303.

As its output, the process 303A outputs:

AileronControlValue—real number, in range [−1, 1], which represents aileron control axis.

ElevatorControlValue—real number, in range [−1, 1], which represents elevator control axis.

RudderControlValue—real number, in range [−1, 1], which represents rudder control axis.

As its input, the process 303A receives:

Aircraft—physical state of user controlled aircraft, which describes such parameters as:

Aircraft.AngularSpeed—three-dimensional vector, where x, y and z component of this vector represents angular speed about longitudinal, vertical and lateral axes of aircraft.

Aircraft.AngularAcceleration—three-dimensional vector, which defines a rate of change of Aircraft.AngularSpeed.

Aircraft.Orientation—representation of orientation of user-controlled aircraft, which can be defined as Euler angles: yaw, pitch, roll, as Quaternion, as 3×3 matrix, or in any other manner, suitable for this task.

DesiredDirectionOfFlight—three-dimensional vector, which defines direction with which user wants to align his aircraft.

AileronCoefficient—real number, which is chosen in such way that it's product with lateral local desired direction of flight will produce such value that if used as AileronControlValue then user controlled aircraft will change its roll toward desired direction of flight.

ElevatorCoefficient—real number, which is chosen in such way that it's product with vertical local desired direction of flight will produce such value that if used as ElevatorControlValue then user controlled aircraft will change its pitch toward desired direction of flight.

RudderCoefficient—real number, which is chosen in such way that it's product with lateral local desired direction of flight will produce such value that if used as RudderControlValue then user controlled aircraft will change its yaw toward desired direction of flight.

Process 303A starts with initialization of predicted angular speed with current angular speed of simulated aircraft (step 401). After that, the process 303A initializes a predicted orientation with the current orientation of the simulated aircraft (step 402). Then, the process 303A enters a loop (step 403), where the exit criteria will be a number of steps. In that loop, the process 303A transforms desired direction of flight by a predicted orientation (step 404), which was initialized in 402 and will be modified in step 409. Next three steps (405-407) calculate the desired aircraft control values based on transformed desired direction of flight, which is the desired direction of flight in the aircraft's coordinate system.

After that, the process 303A calculates the desired aileron control value (step 405), based on assumption that the algorithm needs to get such a simulated aircraft orientation, so the transformed desired direction of flight will be right on top or below the simulated aircraft. Then, the process 303A calculates a desired elevator control value (step 406), based on the assumption that it needs to get such a simulated aircraft orientation, that y-component of the transformed desired direction of flight will become closer to zero. After that, process 303A calculates a desired rudder control value (step 407), based on the assumption that it needs to get such a simulated aircraft orientation, that z-component of the transformed desired direction of flight will become closer to zero.

Then, the process 303A increments a predicted angular speed by the current angular acceleration of the simulated aircraft (step 408). Then the process 303A calculates amount of angular speed that needs to be incremented to predicted orientation (step 409). After that the process 303A increments predicted orientation with the predicted angular speed (step 410). Then the process 303A starts over until it runs a specified number of times.

Exact values of simulated aircraft controls that should be applied are calculated based on difference between the transformed desired direction of flight axis values and coefficients, which are calculated separately, as well as the number of steps the loop is run.

An example of process 303A in the form of pseudo-code can be as follows:

```
401:    AngularSpeed = Aircraft.AngularSpeed
402:    PredictedOrientation = Aircraft.Orientation
403:    for (i = 0; i < NumberOfSteps; i = i + 1)
404:        LocalDirection = transform(PredictedOrientation,
            DesiredDirectionOfFlight);
405:        AileronControlValue = LocalDirection.z * AileronCoefficient;
406:        ElevatorControlValue = LocalDirection.y * ElevatorCoefficient;
407:        RudderControlValue = LocalDirection.z * RudderCoefficient;
408:        AngularSpeed = AngularSpeed + Aircraft.AngularAcceleration
409:        AngularSpeedStep = AngularSpeed * AngularSpeedCoefficient
410:        PredictedOrientation =
            OrientationIncrement(PredictedOrientation, AngularSpeedStep)
        end for
```

Where "transform" is a function which takes orientation (PredictedOrientation in this case) as a first argument, direction (DesiredDirectionOfFlight in this case) as a second argument and returns direction in a local coordinate system of orientation. All three coefficients (RudderCoefficient, AileronCoefficient, ElevatorCoefficient)—can be constants or depend on differences in desired and current orientation and/or on previous values.

Example: user changes desired direction of flight in such way that it points straight above simulated aircraft. Then LocalDirection will have positive vertical component and ElevatorControlValue will be set to positive number, which represents pulling aircraft joystick. If the user changes desired direction of flight in a way that it points below the simulated aircraft, then ElevatorControlValue will be a negative number, which corresponds to pushing down on the aircraft's joystick. Absolute value of ElevatorControlValue will represent deflection from a neutral position, so that when the simulated aircraft aligns with the desired direction of flight, it will decrease deflection of joystick.

Example: user changes desired direction of flight in such way that it points to the left of simulated aircraft. Then LocalDirection will have positive lateral component and Aileron- ControlValue and RudderControlValue will be set to positive number, which represents moving aircraft joystick to left and pressing left rudder pedal in simulated aircraft. In next simulation steps aircraft will change its roll and LocalDirection will get positive vertical component, so ElevatorControlValue will become a positive number and stick will be pulled too, aligning with desired direction of flight.

Figure 6:
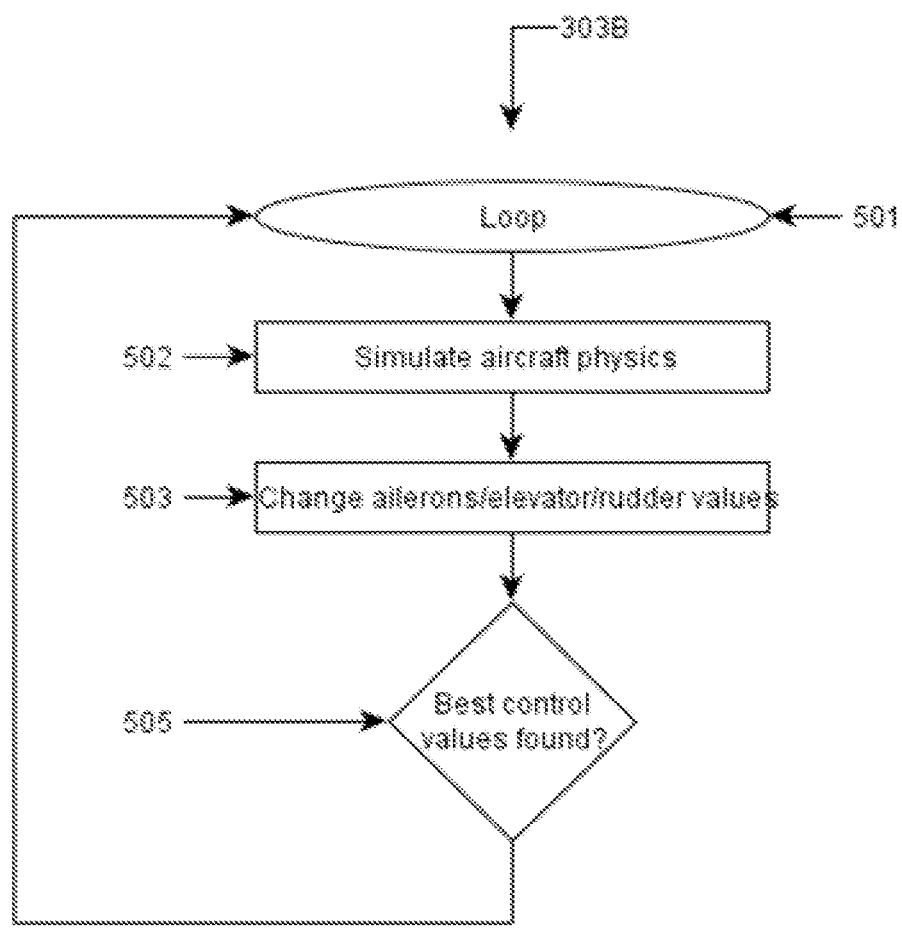
FIG. 6 is a flow diagram of another preferred implementation of a portion of process shown in FIG. 2.

FIG. 6 shows a flow diagram with an exemplary implementation of the process 303. Process 303B starts with a loop 501, whose exit criteria is a number of steps. Then it simulates aircraft physics (step 502), which can range from full aerodynamic simulation to simple analytical models.

Inside loop 501, process 303B changes control values of ailerons/elevator/rudder (step 503) with or without any heuristics. If implemented without heuristics, change can be made randomly, by applying some minor deflection from current aircraft control values, or from best found aircraft control values. Although heuristics is strongly recommended as it will reduce number of steps needed in loop 501 to provide satisfactory results. Heuristics can be implemented by using projection of desired direction of flight on aircraft forward, up and left directions and deflecting ailerons/elevator/rudder in appropriate direction, applying coefficient to this projections, similar to steps 404-407 in process 303A.

After that, it continues with loop 501, if its number of steps is not exceeded.

Figure 7:
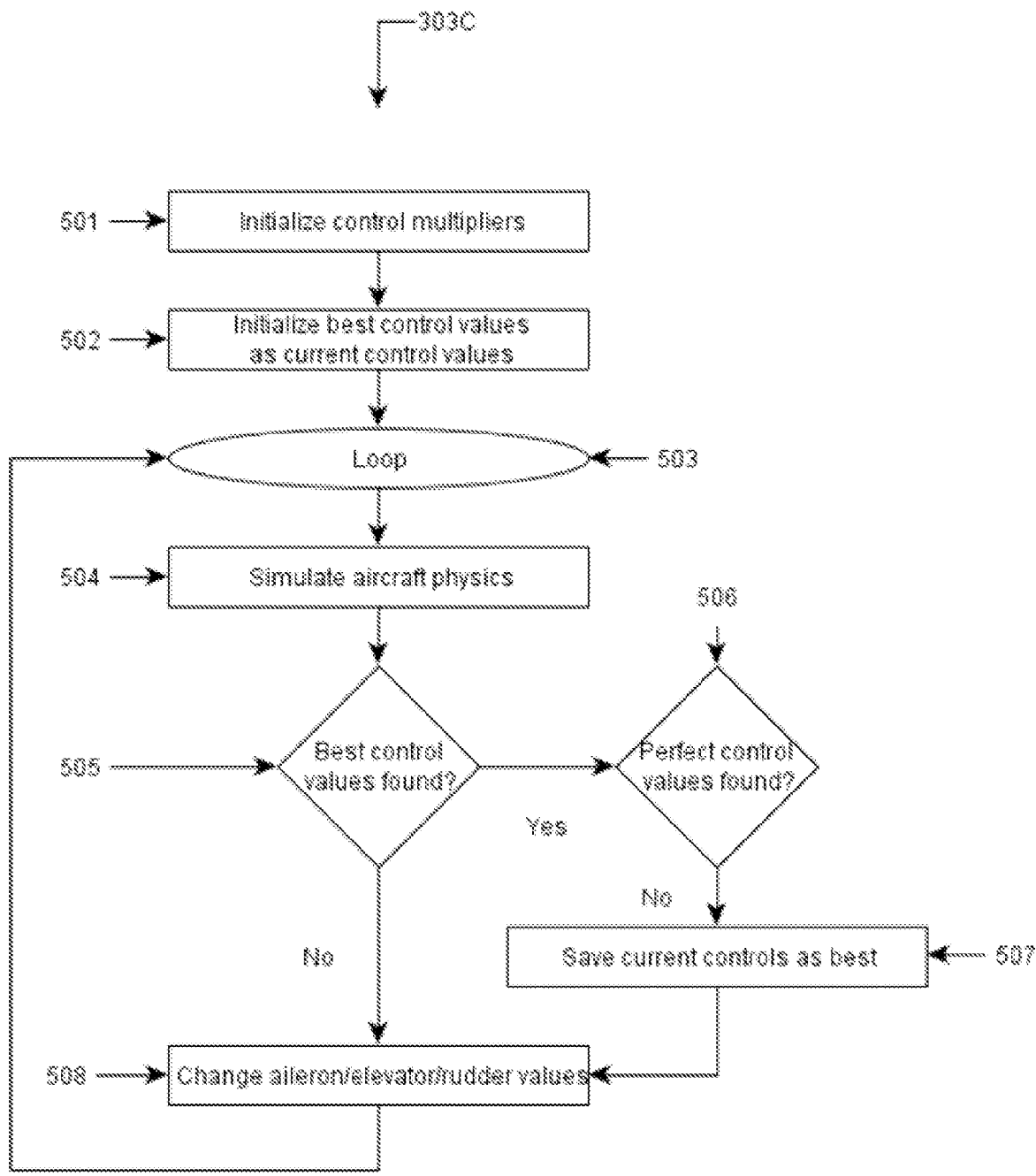
FIG. 7 is a flow diagram of yet another preferred implementation of a portion of process shown in FIG. 2.

FIG. 7 is a flow diagram of yet another preferred implementation of a portion of process shown in FIG. 2. In step 701, the process 303B starts with initialization of aileron, elevator and rudder control multipliers, which will be used in step 708. In step 702, the process 303B initializes best aileron, elevator and rudder control values with current aircraft control values. In step 703: the process 303B starts a loop, whose exit criteria is a number of steps.

In step 704, inside the loop 703, the process 303B simulates aircraft several times with process 305 using current aircraft control values, thus simulating aircraft to some point in future if current control values applied to it. In step 705, the process 303B compares how well aircraft is aligned with the desired direction of flight by using a vector dot product between simulated in step 704 aircraft direction of flight with desired direction of flight as heuristics, and if it is greater than the best heuristic score, then continuing to step 706, otherwise going to step 708.

In step 706, the current score, found in step 705 is compared with threshold score, and if the score is greater, then the perfect value has been found, which will be used for aircraft control, otherwise continuing to step 707.

In step 707, current control values are saved as the best control values and the current score is saved as best score. In step 708, multipliers, initialized in step 701, are multiplied by 2 if aircraft, after simulation in step 704 has moved towards desired direction of flight, and divided by 2 if aircraft moved past desired direction of flight during simulation in step 704. Then, new aircraft controls is set for next simulation step, as sum of current control value and product of local desired direction of flight and corresponding multiplier: ControlValue=ControlValue+ LocalDirectionForControl*ControlMultiplier.

The approach described herein permits controlling the aircraft by pointing to where the aircraft needs to go, rather than through manipulation of the aircraft's control surfaces. For example, the user can look right quickly, and move the mouse cursor, and the aircraft will turn in that direction as fast as the aircraft's aerodynamics allow. The conventional approach requires considerable understanding of aircraft flight behavior (which is often not as intuitive as many novices think), while the present approach permits far better orientation in space and fairly simple control scenarios.

Mouse-based aircraft control places more burden on the analytical aspects of aircraft behavior. Unlike conventional approach, where the user gives commands "rotate this control surface, pitch the aircraft 60 degrees, and by rotating the rudder, gain altitude at 30 degrees, and, once reaching desired roll and pitch, return the control surfaces to neutral", here, the user simply needs to point the mouse' cursor, and the actions with the control surfaces will take place automatically. The user is freed from the complexities of thinking about control surface manipulation.

Although the preferred embodiments of the present invention shows the desired direction of flight as absolute direction in a simulated environment, this invention can also be used such that a desired direction of flight will be used as a deflection from a simulated aircraft direction. So, pointing the desired direction of flight to the left of the aircraft will make the simulated aircraft fly to the left of its current orientation, and so on.

Although the preferred embodiments of the present invention shows the aircraft from third person perspective, the present invention could also be applied to show perspective from inside of the simulated aircraft or any other position in or around the aircraft.

Although the preferred embodiments of the present invention have been principally shown and described as relating to flight simulators, the present invention could also be used as an arcade flight game—the only difference is in flight simulation, but using physics as a "black box", and the flight physics can be very simple or very detailed (including a real plane in case of 303A).

Figure 9:
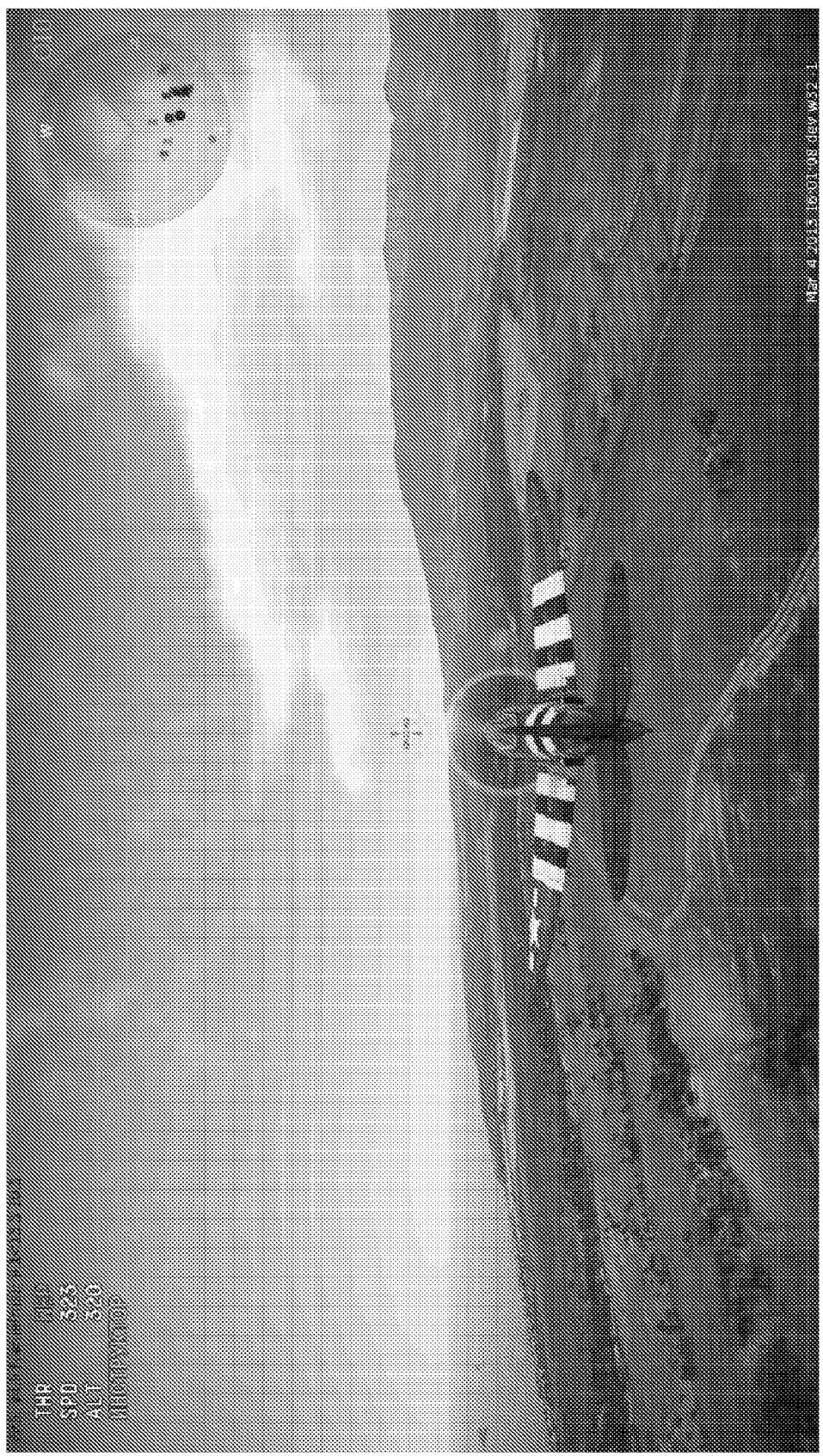
FIGS. 9-13 illustrate screenshots of an exemplary embodiment.
Figure 10:
Figure 11:
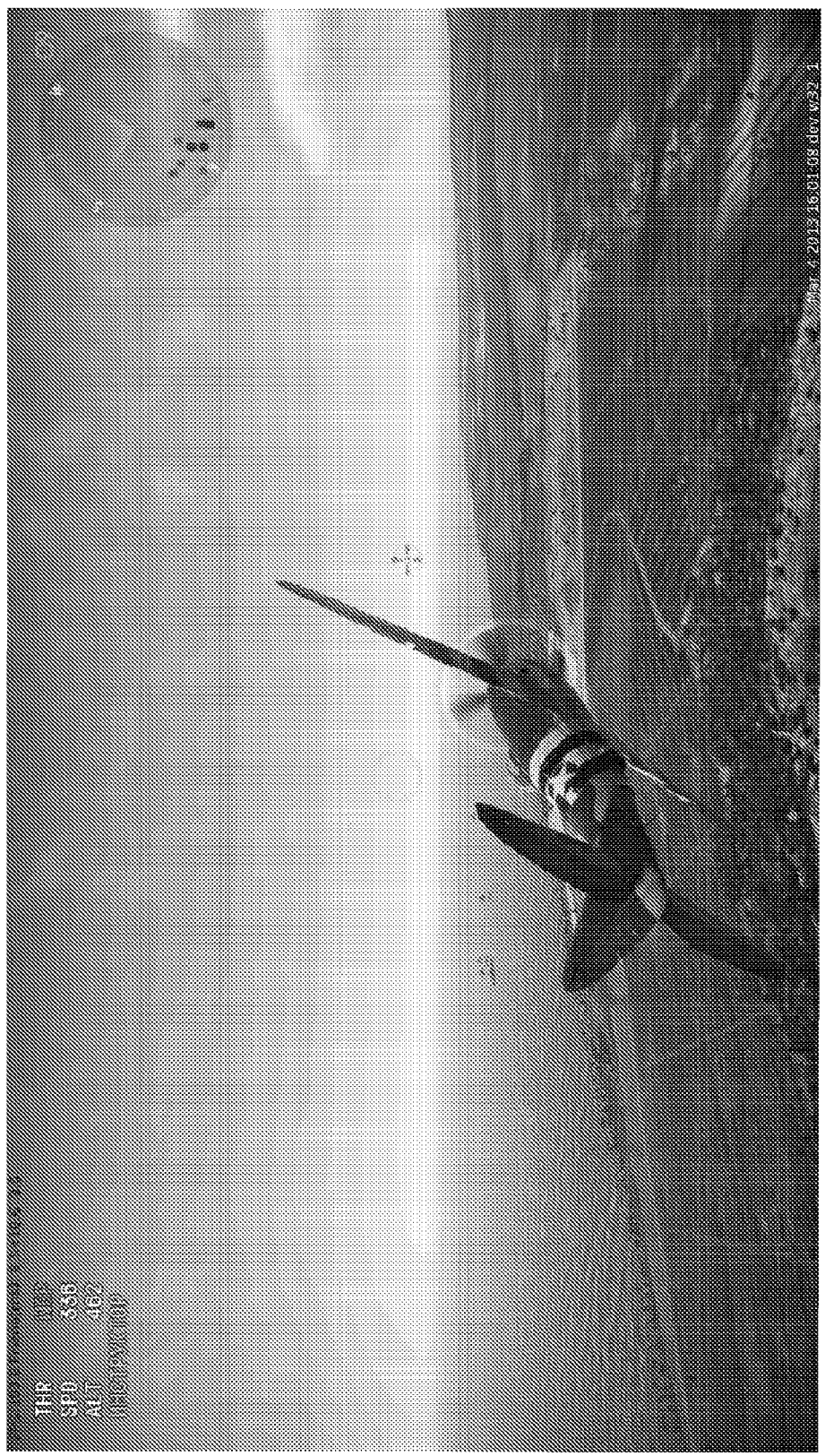
Figure 12:
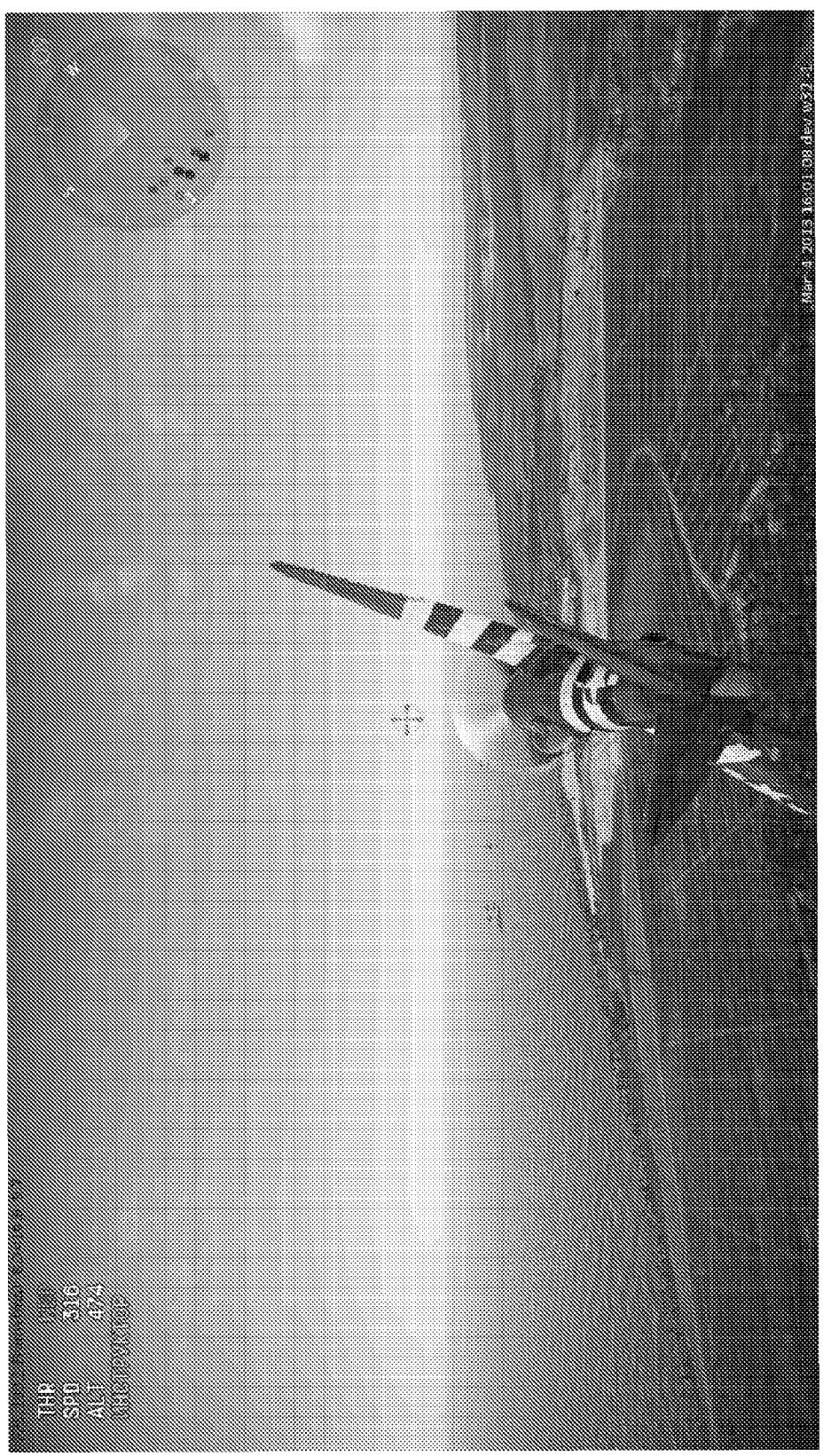
Figure 13:
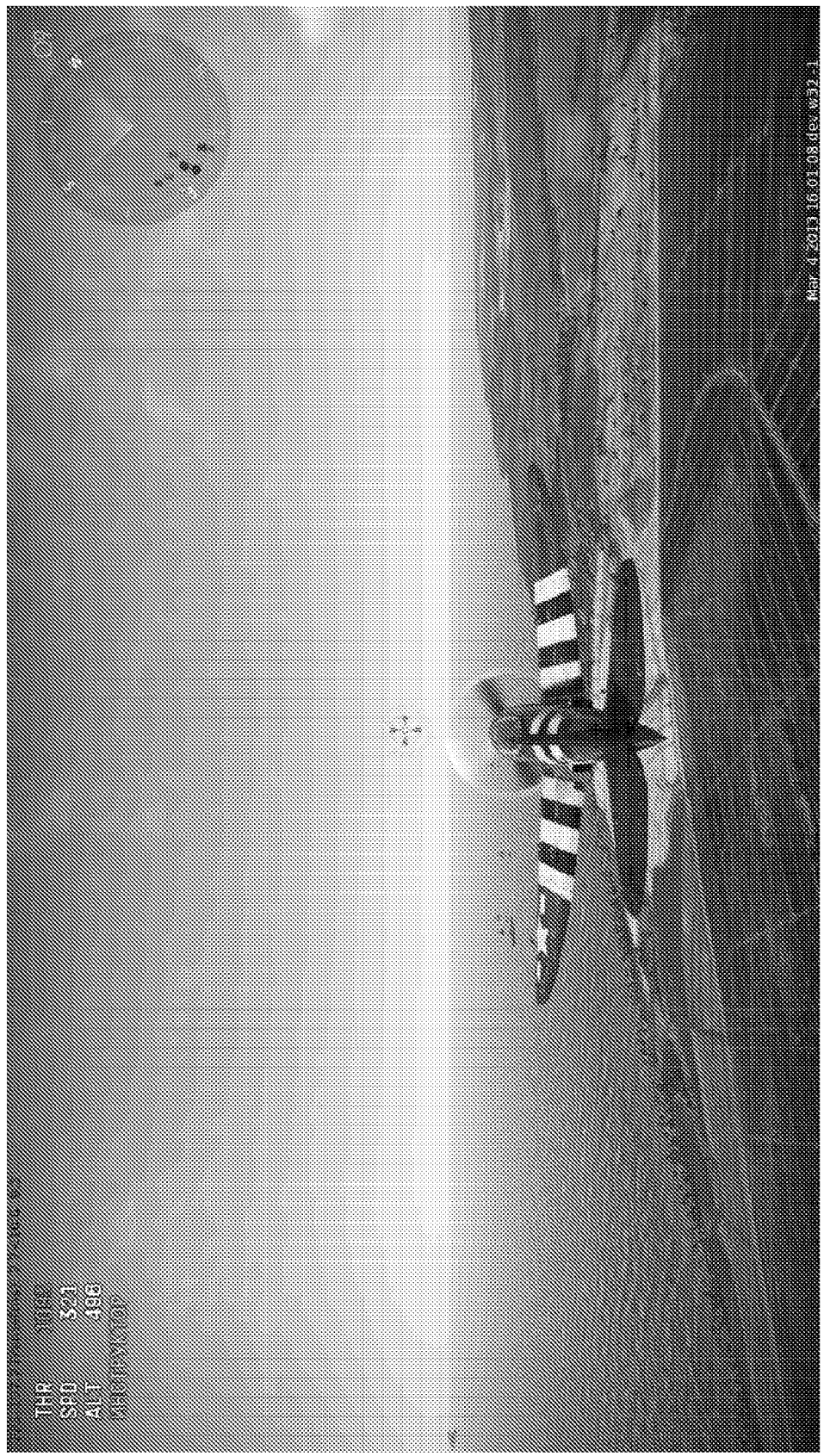

The screenshot in FIG. 9 shows the aircraft flying west, when its direction is aligned with desired direction of flight. Then, starting with the screenshot in FIG. 10, the desired direction of flight changes to south-west. In FIG. 10, it is visible how aircraft rolls using its ailerons, which are deflected. In FIG. 11, the aircraft fully deflects its elevator to align with the desired direction of flight. In FIG. 12, the aircraft direction is almost aligned and it starts to roll back to level flight. In FIG. 13, the aircraft is aligned with new desired direction of flight.

Although the preferred embodiment of the present invention shows present invention as single user system, it can be implemented as multiple user system (some of which might be controlled through conventional joystick means, and others, through the mechanism described in this application). A multiple user system can be implemented by using, for each user, his own separate aircraft control system, shown in FIG. 1 to control the user's aircraft, while sending data to a server/game host machine, which then transfers position, orientation, velocity, and other data of each of other users aircraft, to the players, so they can observe each other's aircraft positions, orientations, velocities, etc.

Multiple user system can be implemented with different data, which users transmit to the server/game host machine.

It can be implemented to send control values of aircraft, such as ailerons, elevators, rudders, such that the server cannot distinguish between a user who controls his aircraft using the present invention, or by using other control schemes, such as joystick control, or keyboard control.

The system can be implemented to send a desired direction of flight to the server, thus reducing possibilities of modification of algorithm of present invention on the client side. It can also be implemented to send both the desired direction of flight and control values of aircraft.

In any of implementations of multiple user system, it is preferred to check all data transmitted from users to host machine and to simulate each user aircraft on the server to prevent users from using modifications of the control algorithms (for example, to prevent a user from giving his aircraft speed that a real aircraft cannot achieve in practice, or from giving his aircraft maneuverability parameters that are beyond the performance envelope of the real aircraft being simulated).

Although described implementations of process 303 have not addressed situations when the aircraft cannot align with the desired direction of flight, it will be clear from the description that this approach can work without making it a special case. These situations can occur when aircraft does not have enough speed, or when it is physically constrained in maneuverability, such as when the aircraft is stationed on the ground. In these situations, the process 303 will be able to output such control values so aircraft will try to get as close to desired direction of flight as practical.

EXAMPLE 1

Aircraft is standing on airfield, preparing to takeoff, when it is not completely aligned with runway. User points desired direction of flight, so it will be parallel to runway, deflecting it from aircraft forward direction. The Process 303 will deflect aircraft controls so that it will align with runway. When aircraft engages its engines and gains speed, the aircraft will be able to align with the desired direction.

EXAMPLE 2

The aircraft is flying at stall speed and the desired direction of flight is aligned with its direction, which in this case is pointing up at 15 degrees. When the user moves desired direction of flight another 5 degrees up (to 20 degrees above horizon), the process 303 will deflect aircraft controls in such way as to get as close to desired direction of flight as possible. It can result in a stall, and the user will need to gain some speed to be able to align with such a desired direction of flight.

Figure 8:
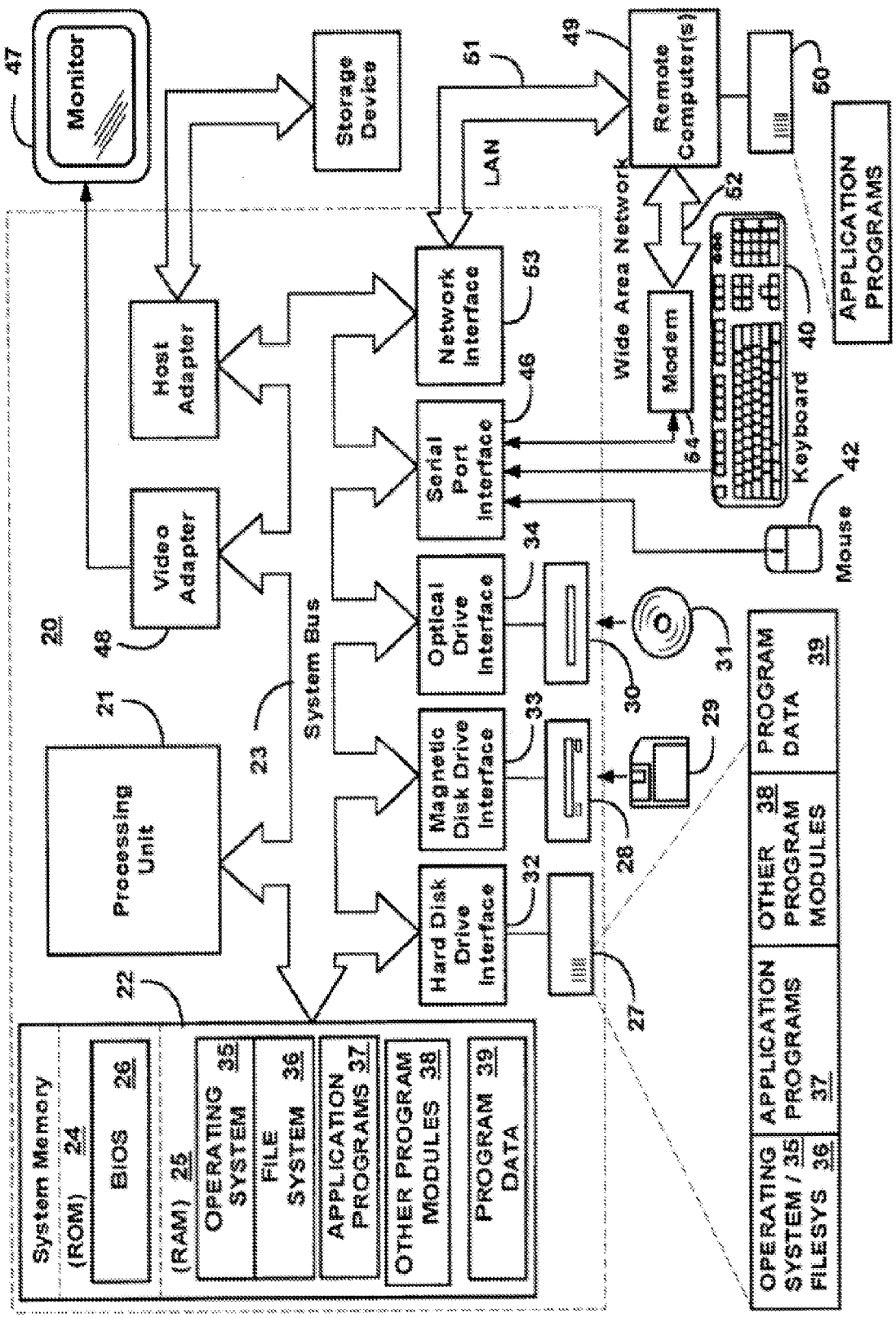
FIG. 8 illustrates a schematic diagram of an exemplary computer or server that can be used in the invention.

With reference to FIG. 8, an exemplary system for implementing the invention includes a general purpose computing device in the form of a personal computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25.

A basic input/output system 26 (BIOS), containing the basic routines that help to transfer information between elements within the personal computer 20, such as during start-up, is stored in ROM 24. The personal computer 20 may further include a hard disk drive interface 32 for reading from and writing to a hard disk 27, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by the hard disk drive interface 32, a magnetic disk drive interface 33, and an optical drive interface 34, respectively. The drives and their associated computer-readable media provide non-volatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, such as the WINDOWS NT™ File System (NTFS), one or more application programs 37, other program modules 38 and program data 39. A user may enter commands and information into the personal computer 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48.

In addition to the monitor 47, personal computers typically include other peripheral output devices (not shown), such as speakers and printers. A data storage device, such as a hard disk drive, a magnetic tape, or other type of storage device is also connected to the system bus 23 via an interface, such as a host adapter via a connection interface, such as Integrated Drive Electronics (IDE), Advanced Technology Attachment (ATA), Ultra ATA, Small Computer System Interface (SCSI), SATA, Serial SCSI and the like.

The computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the computer 20.

The computer 20 may further include a memory storage device 50. The logical connections include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46.

In a networked environment, program modules depicted relative to the personal computer 20, or portions thereof, may be stored in the remote memory storage device. It will be appreciated that the network connections shown are exemplary and other means of establishing a communications link between the computers may be used.

In a networked environment, program modules depicted relative to the personal computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. It should also be appreciated that various modifications, adaptations and alternative embodiments thereof may be made within the scope and spirit of the present invention. The invention is further defined by the following claims.

What is claimed is:

1. An aircraft control system for a user of a simulated aircraft through a desired direction of flight, comprising:
    a video device for presenting the user with a view of a simulated environment;
    modeling means responsive to the desired direction of flight for determining position and orientation of the simulated aircraft;
    wherein the modeling means analyzes which control surface adjustments are needed to the simulated aircraft to fly along the desired direction of flight and modifies a simulated aircraft state to align the simulated aircraft with the desired direction of flight; and
    a plurality of simulated input devices for controlling the desired direction of flight, wherein the user controls the direction of flight by moving a graphical element on the video device.

2. The system of claim 1, further comprising showing movement of the graphical element on the video device in response to joystick commands.

3. The system of claim 1, wherein the graphical element is a circle.

4. The system of claim 1, wherein the graphical element is a cross-hairs.

5. The system of claim 1, wherein the graphical element moves in response to the user moving a mouse.

6. The system of claim 1, wherein in response to the movement of the graphical element on the video device, parameters of the simulated aircraft, including its ailerons, elevator and rudder are changed so as to bring a current direction of flight of the simulated aircraft aligned with the desired direction of flight.

7. The system of claim 1, further providing a camera view of the simulated aircraft such that the desired direction of flight is in a center of the camera view.

8. The system of claim 1, wherein the system provides, as its outputs, an aileron control value, an elevator control value, and a rudder control value, which correspond to physical parameters of the simulated aircraft, in a range $[-1, 1]$, which represents aileron control axis.

9. The system of claim 8, wherein coefficients used to calculate the aileron control value, the elevator control value, and the rudder control value are constants.

10. The system of claim 8, wherein coefficients used to calculate the aileron control value, the elevator control value, and the rudder control value depend on differences between a desired orientation and a current orientation.

11. The system of claim 8, wherein coefficients used to calculate the aileron control value, the elevator control value, and the rudder control value depend on differences between current values and previous values.

12. The system of claim 8, wherein coefficients used to calculate the aileron control value, the elevator control value, and the rudder control value are calculated based on a heuristic algorithm.

13. The system of claim 8, wherein the aileron control value, the elevator control value, and the rudder control value are calculated based on a full aerodynamic model of the simulated aircraft.

14. The system of claim 1, wherein the system receives, as its inputs, current aircraft linear speed, current aircraft linear acceleration, current aircraft angular speed, current aircraft angular acceleration, current aircraft orientation, and the desired direction of flight.

15. The system of claim 14, wherein the aircraft orientation is represented by any of (a) Euler angles, including yaw, pitch, roll, (b) quaternion, and (c) a 3×3 matrix.

16. The system of claim 1, wherein the graphical element represents an absolute desired direction of flight.

17. The system of claim 1, wherein the graphical element represents a difference from a current direction of flight.

18. The system of claim 1, wherein a server verifies that flight parameters transmitted by the system correspond to modeled parameters of a real aircraft.

19. The system of claim 1, wherein the system displays the simulated aircraft from a third person perspective.

20. The system of claim 1, wherein the system displays a perspective from inside the simulated aircraft.

21. The system of claim 1, wherein the system displays a perspective from an arbitrary position around the simulated aircraft.

22. In a system for simulating an aircraft, the system having a processor, input devices, and a video display for displaying a simulated environment, a method of controlling a simulated aircraft through indicating a desired direction of flight comprising the steps of:
    (a) receiving signals from one of the input devices, the signals indicative of a change of the desired direction of flight indicated by a user on a video display by controlling a graphical element on the video display;
    (b) calculating in the processor which changes to the simulated aircraft and its control surfaces should be done to align the simulated aircraft with the desired direction of flight;
    (c) applying the changes to the simulated aircraft and its control surfaces;
    (d) calculating new position and orientation of the simulated aircraft after applying the changes;
    (e) simultaneously displaying on the video display a view of the simulated environment and the simulated aircraft; and
    (f) repeating steps (a)-(e).

23. An aircraft game system, comprising:
    a server hosting game logic;
    the server receiving data from a plurality of users, wherein some of the users utilize
    (i) a video for presenting a user with a view of a simulated environment;
    (ii) modeling means responsive to the desired direction of flight for determining position and orientation of a simulated aircraft;
    (iii) wherein the modeling means analyzes which control surface adjustments are needed to make the simulated aircraft fly along the desired direction of flight and modifies a simulated aircraft state to align the aircraft with the desired direction of flight; and
    (iv) a plurality of simulated input devices for controlling the desired direction of flight, and wherein other users utilize a joystick for directly controlling simulated aircraft control surfaces by moving a graphical element on the video device, and aircraft parameters to the server based on the joystick operation.

* * * * *

UNITED STATES PATENT AND TRADEMARK OFFICE
CERTIFICATE OF CORRECTION

PATENT NO. : 8,770,979 B2  
APPLICATION NO. : 13/792025  
DATED : July 8, 2014  
INVENTOR(S) : Kirill Yudintsev et al.

Page 1 of 1

It is certified that error appears in the above-identified patent and that said Letters Patent is hereby corrected as shown below:

In the Drawings

Drawing Sheet 7 of 13,  
In FIG. 7, replace "501" with --701--.  
In FIG. 7, replace "502" with --702--.  
In FIG. 7, replace "503" with --703--.  
In FIG. 7, replace "504" with --704--.  
In FIG. 7, replace "505" with --705--.  
In FIG. 7, replace "506" with --706--.  
In FIG. 7, replace "507" with --707--.  
In FIG. 7, replace "507" with --707--.

Signed and Sealed this  
Twentieth Day of January, 2015

Michelle K. Lee  
*Deputy Director of the United States Patent and Trademark Office*